(12) United States Patent
Corbett

(10) Patent No.: US 9,952,312 B2
(45) Date of Patent: Apr. 24, 2018

(54) RADAR INTERFERENCE MITIGATION

(71) Applicant: Navico Holding AS, Egersund (NO)

(72) Inventor: Andrew Corbett, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 195 days.

(21) Appl. No.: 14/791,751

(22) Filed: Jul. 6, 2015

(65) Prior Publication Data

US 2017/0010344 A1 Jan. 12, 2017

(51) Int. Cl.
*G01S 7/02* (2006.01)
*G01S 7/35* (2006.01)

(52) U.S. Cl.
CPC .............. *G01S 7/023* (2013.01); *G01S 7/354* (2013.01)

(58) Field of Classification Search
CPC ...... G01S 7/292; G01S 7/2921; G01S 7/2923; G01S 7/2927; G01S 7/414; G01S 13/5244
See application file for complete search history.

(56) References Cited

U.S. PATENT DOCUMENTS

| | | |
|---|---|---|
| 4,021,805 A | 5/1977 | Effinger et al. |
| 4,028,700 A | 6/1977 | Carey et al. |
| 4,047,173 A | 9/1977 | Miller |
| 4,068,233 A | 1/1978 | Pease et al. |
| 4,114,154 A | 9/1978 | Sarfati |
| 4,211,485 A | 7/1980 | Koreicho |
| 4,216,474 A | 8/1980 | Levine |
| 4,243,988 A | 1/1981 | Kang et al. |
| 4,328,495 A | 5/1982 | Thue |
| 4,353,067 A | 10/1982 | Mims |
| 4,566,010 A | 1/1986 | Collins |
| 4,626,853 A | 12/1986 | Lee et al. |
| 4,686,534 A | 8/1987 | Eddy |
| 4,772,889 A | 9/1988 | Elleaume |
| 4,800,388 A | 1/1989 | Okada |
| 4,929,954 A | 5/1990 | Elleaume |
| 4,989,010 A | 1/1991 | Crevoulin et al. |

(Continued)

FOREIGN PATENT DOCUMENTS

| | | |
|---|---|---|
| CN | 101464513 A | 6/2009 |
| EP | 1 684 479 | 7/2006 |

(Continued)

OTHER PUBLICATIONS

European Commission Community Research; Contract No. 248231; *More Safety for All by Radar Interference Mitigation, D1.5—Study on the state-of-the-art interference mitigation techniques*; The MOSARIM Consortium; 2010 (70 pgs.).

*Primary Examiner* — Peter M Bythrow
*Assistant Examiner* — Daniel P Malley, Sr.
(74) *Attorney, Agent, or Firm* — Nelson Mullins Riley & Scarborough LLP

(57) ABSTRACT

Various implementations described herein are directed to a method for mitigating radar interference. The method may include receiving time domain signals from a radar device and transforming the time domain signals to time-frequency domain signals. The method may include comparing each time-frequency domain signal with one or more surrounding time-frequency domain signals to determine which of the time-frequency domain signals have interference. The method may include repairing the time-frequency domain signals having interference.

16 Claims, 12 Drawing Sheets

(56) References Cited

U.S. PATENT DOCUMENTS

| | | | |
|---|---|---|---|
| 5,003,313 A | 3/1991 | Doriath | |
| 5,128,681 A | 7/1992 | McGroary et al. | |
| 5,141,308 A | 8/1992 | Danckwerth et al. | |
| 5,151,702 A | 9/1992 | Urkowitz | |
| 5,173,706 A | 12/1992 | Urkowitz | |
| 5,309,161 A | 5/1994 | Urkowitz et al. | |
| 5,345,470 A | 9/1994 | Alexander | |
| 5,389,933 A | 2/1995 | Golinsky | |
| 5,414,428 A | 5/1995 | Gallagher et al. | |
| 5,481,270 A | 1/1996 | Urkowitz et al. | |
| 6,067,043 A | 5/2000 | Faure et al. | |
| 6,121,918 A | 9/2000 | Tullsson | |
| 6,377,204 B1 | 4/2002 | Wurman et al. | |
| 6,469,662 B2 | 10/2002 | Tullsson | |
| 6,654,623 B1* | 11/2003 | Kastle | G06F 17/148 600/323 |
| 6,707,419 B2 | 3/2004 | Woodington et al. | |
| 7,019,686 B2 | 3/2006 | Hester et al. | |
| 7,106,250 B2 | 9/2006 | Blunt et al. | |
| 7,675,458 B2 | 3/2010 | Hubbard et al. | |
| 7,688,257 B1 | 3/2010 | Christianson et al. | |
| 7,764,223 B2 | 7/2010 | Wade | |
| 8,022,863 B1 | 9/2011 | Nuthalapati | |
| 2006/0036353 A1* | 2/2006 | Wintermantel | G01S 7/023 700/300 |
| 2006/0182364 A1* | 8/2006 | John | G06T 5/004 382/260 |
| 2008/0111734 A1 | 5/2008 | Fam et al. | |
| 2009/0121920 A1 | 5/2009 | Mullarkey et al. | |
| 2009/0292475 A1* | 11/2009 | Alam | G01V 1/34 702/14 |
| 2011/0273963 A1* | 11/2011 | Onishi | G01S 7/2927 367/93 |
| 2012/0026031 A1* | 2/2012 | Goodman | G01S 7/2923 342/159 |
| 2012/0262332 A1 | 10/2012 | Ohnishi | |
| 2012/0293361 A1 | 11/2012 | Mowbray et al. | |
| 2013/0342383 A1* | 12/2013 | Kojima | G01S 13/10 342/134 |
| 2014/0070983 A1* | 3/2014 | Maalouli | G01S 7/414 342/192 |
| 2015/0160066 A1* | 6/2015 | Sai | G01F 23/284 342/21 |

FOREIGN PATENT DOCUMENTS

| | | |
|---|---|---|
| EP | 1 775 600 | 4/2007 |
| GB | 2 218 293 | 11/1989 |
| JP | 2982769 B2 | 11/1999 |
| JP | 2009-128278 A | 6/2009 |

* cited by examiner

RADAR INTERFERENCE MITIGATION

BACKGROUND

This section is intended to provide information to facilitate an understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Radar provides marine vessels with the capability to safely navigate courses through unknown bodies of water. As such, radar is a useful tool in marine navigation by tracking neighboring vessels and obstacles in close proximity to a marine vessel.

SUMMARY

Described herein are various implementations of a method for mitigating radar interference. In one implementation, the method may include receiving time domain signals from a radar device and transforming the time domain signals to time-frequency domain signals. The method may include comparing each time-frequency domain signal with one or more surrounding time-frequency domain signals to determine which of the time-frequency domain signals have interference. The method may include repairing the time-frequency domain signals having interference.

Described herein are various implementations of technologies for mitigating radar interference. In one implementation, a non-transitory computer-readable medium having stored thereon a plurality of computer-executable instructions which, when executed by a computer, cause the computer to receive time domain waveforms for multiple sweeps of a radar device and transform the time domain waveforms for the multiple sweeps to time-frequency domain waveforms for the multiple sweeps. The instructions may further cause the computer to determine which of the time-frequency domain waveforms have interference by comparing a magnitude of each time-frequency domain waveform for each sweep to a first pre-determined magnitude calculated based on magnitudes of surrounding time-frequency domain waveforms of surrounding sweeps. The instructions may further cause the computer to modify the time-frequency domain waveforms having interference by adjusting the magnitude for each sweep having interference to a second pre-determined magnitude.

Described herein are implementations of technologies for a method to mitigate radar interference. In one implementation, the method may include receiving signals in time domain for multiple sweeps of a radar device, performing a time-frequency transform on the received signals, and examining each signal for each sweep in comparison with surrounding signals for remaining sweeps to determine which of the signals have interference. The method may include repairing the signals in time-frequency domain having interference by removing at least a portion of the interference from each of the signals in time-frequency domain having interference. The method may include performing a reverse time-frequency transform on each of the signals in time-frequency domain including the repaired signals in time-frequency domain.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques are hereafter described with reference to the accompanying drawings. It should be understood, however, that the accompanying drawings illustrate only various implementations described herein and are not meant to limit the scope of various techniques described herein.

DETAILED DESCRIPTION

Various implementations for mitigating radar interference will now be described in reference to FIGS. 1A-15.

Figure 1A:
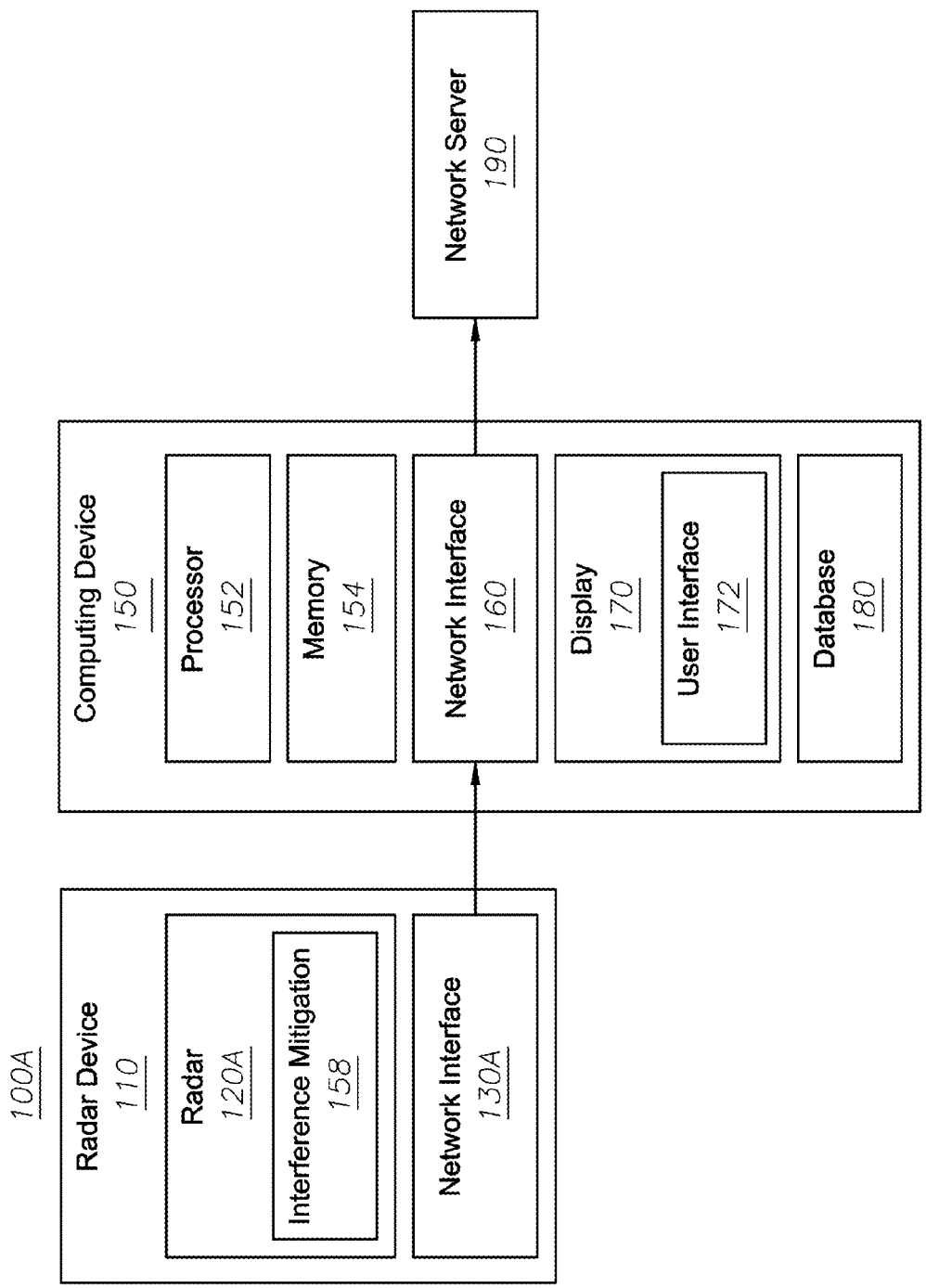
FIG. 1A illustrates a block diagram of a radar interference mitigation system in accordance with various implementations described herein.

FIG. 1A illustrates a block diagram of a radar interference mitigation system 100A in accordance with various implementations described herein.

In reference to FIG. 1A, the radar interference mitigation system 100A may include a radar device 110 having at least one radar 120A, such as, e.g., a frequency-modulated continuous-wave (FMCW) radar, a pulse-compression type radar, or some other type of radar. Further, the system 100A may include a computing device 150 and a network server 190. The radar device 110 may be configured to generate radar data and information using the at least one radar 120A. The radar device 110 may be configured to transmit or upload radar data and information to the computing device 150 via a wired or wireless network. The computing device 150 may be a marine electronics device or multi-function display (MFD) configured for interfacing with the radar device 110 and/or the at least one radar 120A. Further, computing device 150 may be configured to transmit or upload the radar data and information received from the radar device 110 to the network server 190 via a wired or wireless network.

The radar device 110 may be used for marine based navigation and may be positioned (or coupled or mounted) to a marine based vessel, such as, e.g., watercraft, boat, ship, etc.). The radar device 110 may be configured to generate radar data and information related to targets on a body of water (e.g., ocean, sea, gulf, river, lake, etc.) using the at least one radar 120A. The radar device 110 may be configured to detect and track targets and/or objects using radar signals (e.g., radio frequency waves) with the at least one radar 120A, while assisting a marine vessel in avoiding obstacles or making course for a specific target. The radar device 110 may be configured to determine one or more characteristics of a target and/or object, including at least one of speed, direction, range, and altitude of the target and/or object. In some instances, a network connection may be used and include various cables for supplying power from a marine vessel to the radar device 110 and for transmitting data and information to and from various instruments on the marine vessel.

In some implementations, the radar device 110 may include technology related to solid-state radar having improved performance against interference from other radars operating in a same frequency band, e.g., other solid-state radars or magnetron based radars. The techniques described herein may be applied to frequency-modulated continuous-wave radar (FMCW) or pulse-compression type radars (or some other types of radar). For instance, pulse radars may have a duty cycle in order of 0.1%, and FMCW radars may have a duty cycle, e.g., of up to 50%. This may refer to situations where, if these two radars are operating in a same area, it may be likely that multiple transmissions overlap and interfere. In some instances, pulse-compression radars have a duty cycle in order of 10%, so may be considered less interfering than FMCW, but may be challenging overall for interference mitigation. Accordingly, the techniques described herein may provide for interference mitigation that may allow solid state radars to mitigate interference and may allow operation without degradation, e.g., FMCW radar on a same vessel as pulse or pulse-compression type radar. In various implementations, the radar 120A may be configured for interference mitigation 158 using techniques as described in greater detail herein.

The radar device 110 may include the network interface 130A, and the radar device 110 may be configured to transmit radar data and information generated by the at least one radar 120A to the computing device 150 via the network interface 130A. The network interface 130A may include a transmitter or transceiver configured to transmit radar data to the computing device 150. As described herein, transmission of radar data between the radar device 110 and the computing device 150 may occur via a network connection. In some instances, transmission of radar data may occur in response to detecting a network, such as a wired or wireless network.

The radar device 110 may include various other components, such as, e.g., an antenna and a power supply. For instance, the antenna may be used to communicate wirelessly with the computing device 150, and the power supply may be used to power various components of the radar system 110, such as, e.g., radar 120A.

Figure 4:
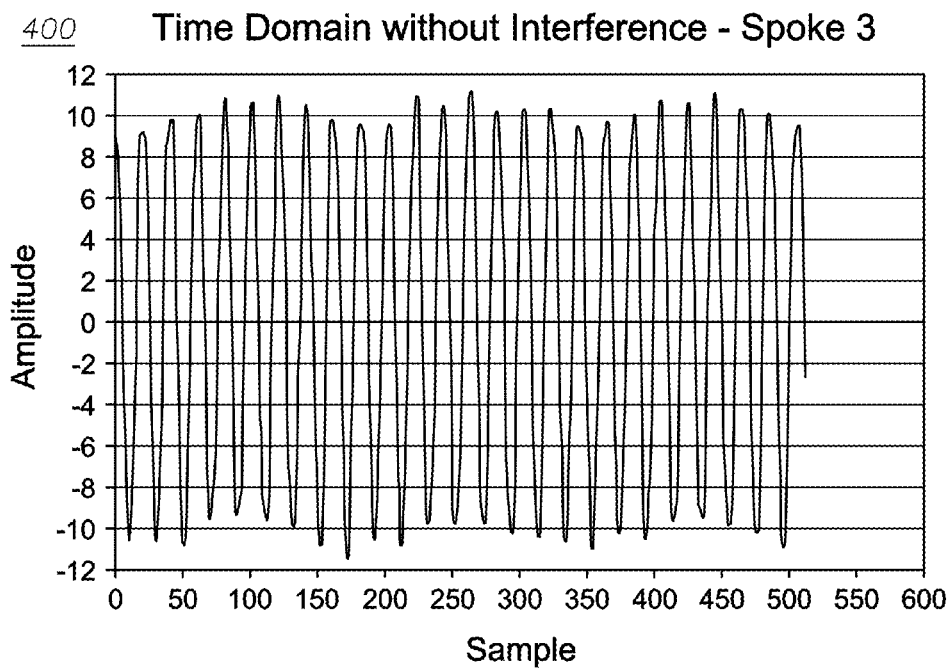
FIGS. 4-11 illustrate various graphic diagrams of mitigating radar interference in accordance with various implementations described herein.

The radar 120A may include various types of radar, including various solid-state radars. For instance, the radar 120A may include FMCW radar configured to transmit known stable frequency continuous-wave radio signals that modulate frequency (i.e., varies frequency) over a fixed period of time with a modulating signal. With FMCW, frequency differences between transmitted signals and received signals increase with delay and distance, where return signals from a target may be mixed with the transmitted signal to produce a beat signal that may thus provide a distance of a target object after demodulation. One example of a beat signal in time domain with no interference is shown in FIG. 4.

The radar 120A may include various other radar related components, such as, e.g., signal processor, transmitter for sending radar signals through an antenna, receiver for receiving radar signals from an antenna, voltage oscillator, amplifier for radar signals received by an antenna, one or more filters to block frequency bands of signals received by an antenna, and/or other similar radar components for receiving, transmitting, processing, and/or analyzing radar signals or waveforms.

Figure 1B:
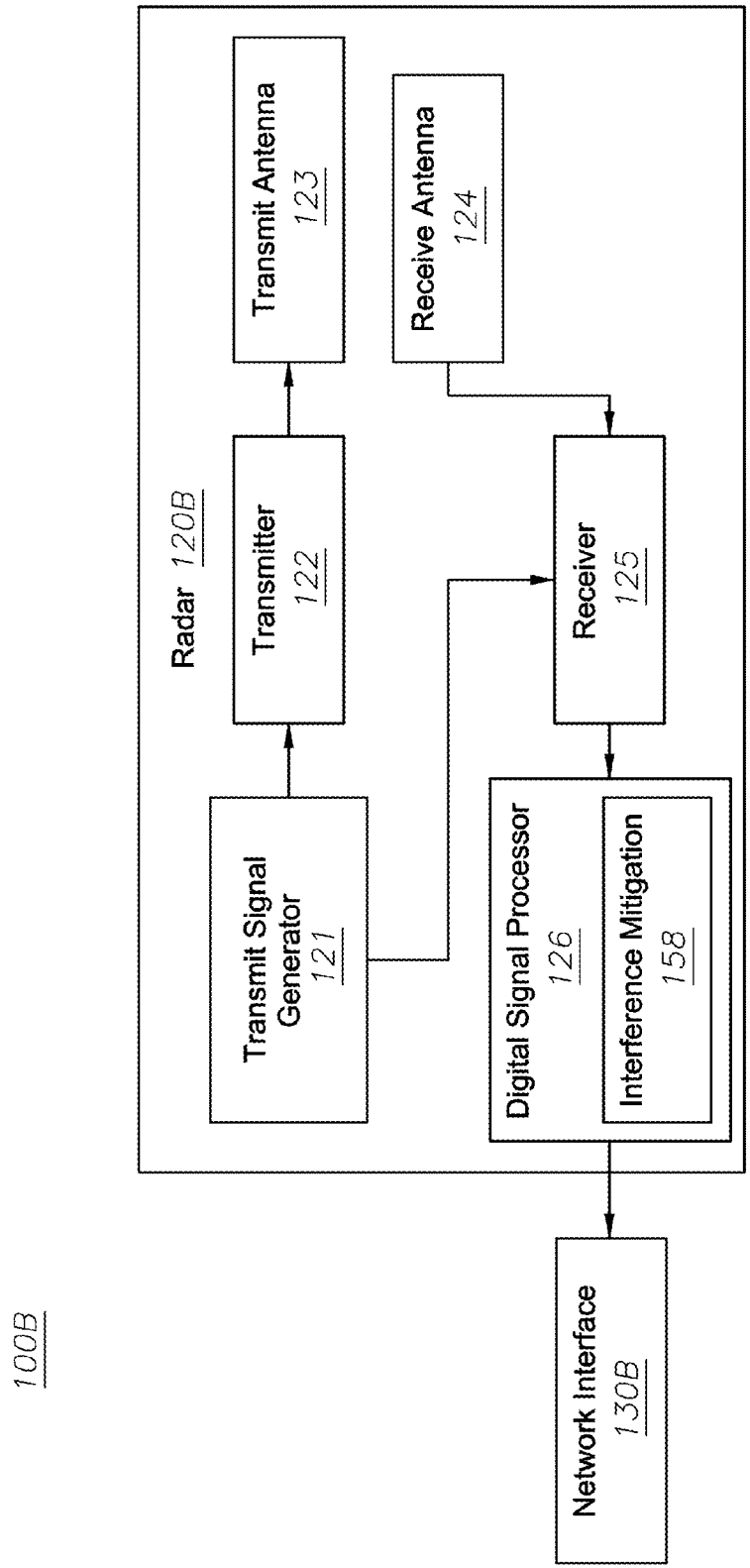
FIG. 1B illustrates a block diagram of a radar system in accordance with various implementations described herein.

In various implementations, the radar 120A may be referred to as a radar system having various components that are configured to transmit, receive, and process radar related signals, data, and information. For instance, FIG. 1B illustrates a block diagram of a radar system 100B in accordance with various implementations described herein. In one implementation, the radar system 100B may include a radar 120B, such as, e.g., a frequency-modulated continuous-wave (FMCW) radar. The radar 120B may be configured with similar functionality of radar 120A, as described in reference to FIG. 1A. Further, in reference to FIG. 1B, the radar 120B may include a transmit signal generator 121, a transmitter 122, a transmit antenna 123, a receive antenna 124, a receiver 125, and a digital signal processor (DSP) 126. The transmit signal generator 121 may be configured to generate a frequency modulated signal. The transmitter 122 may be configured to generate a radio frequency (RF) signal that may be emitted by a transmit antenna 123. The receive antenna 124 may be configured to receive a reflected signal from a target. The receiver 125 may be configured to mix the received signal with the transmitted signal to produce a "beat signal". The beat signal may be digitized and fed into (or received by) the digital signal processor 126 for processing. The radar data may be sent over a network (e.g., wired or wireless network) to the computing device 150 (e.g., MFD) of FIG. 1A using the network interface 130B, which may have the same or similar functionality of the network interface 130A of FIG. 1A. Although this diagram shows two antennas, it is well known in the art that an FMCW radar may be implemented using a single antenna, such as, e.g., a transceiver configured to transmit and receive RF signals.

In some implementations, as will be described in more detail herein, the DSP 126 may be configured to receive radar signals from the receiver 125 and transform radar signals in time domain to time-frequency domain. The DSP 126 may be configured for examining (or analyzing or inspecting) each radar signal in time-frequency domain with respect to one or more surrounding radar signals in time-frequency domain to determine which of the radar signals in time-frequency domain have or at least partially include interference. Further, in various implementations, the DSP 126 may be configured for interference mitigation 158 using techniques as described in greater detail herein. For instance, the DSP 126 may be configured for repairing the radar signals in time-frequency domain having interference and then inverse transforming radar signals in time-frequency domain (including repaired time-frequency domain radar signals) to other time domain radar signals (including repaired time domain radar signals). Further, interference mitigation 158 may refer to a component or module (e.g., hardware and/or software) that may be implemented in the DSP 126, wherein interference mitigation techniques may be performed by the DSP 126. These and other aspects associated with mitigating radar interference in radar signal are further described herein below.

Referring back to FIG. 1A, the computing device 150 may be configured to receive radar data and related information from the radar device 110 over a network via a network interface 160. The computing device 150 may include at least one processor 152 and memory 154 having instructions that cause the processor 152 to receive the radar data and/or display images associated with the radar data on a display component or device 170. The computing device 150 may be configured to create/generate radar data logs associated with the radar data. The computing device 150 may be configured to store, record, and/or log the radar data and/or radar data logs in one or more databases (e.g., database 180). The computing device 150 may be configured for real-time display of radar data received from the radar device 110. Further, the computing device 150 may be configured to upload the radar data and/or sonar logs to the network server 190, such as, e.g., a cloud server or various other types of network servers, via the network interface 160.

In various implementations, the computing device 150 may be configured as a special purpose machine for interfacing with the radar device 110 having the at least one radar 120A. Further, the computing device 150 may include various standard elements and/or components, including power, peripherals, and various other computing components that may not be specifically shown in FIG. 1A. Further, the computing device 150 may include the display device 170 (e.g., a monitor or other computer display) that may be used to provide a user interface (UI) 172, including a graphical user interface (GUI). In FIG. 1A, the display 170 is shown as an incorporated part of the computing device 150; however, the display 170 may be implemented as a separate component. Further, the UI 172 may be used to receive one or more preferences from a user of the display device 170 for managing or utilizing the radar interference mitigation system 100A, including interfacing with the radar device 110 and the at least one radar 120A. As such, a user may setup desired behavior of the system 100A and/or the radar 120A via user-selected preferences using the UI 172 associated with the display device 170. Various elements and/or components of the system 100A that may be useful for the purpose of implementing the system 100A may be added, included, and/or interchanged, in manner as described herein.

Figure 2:
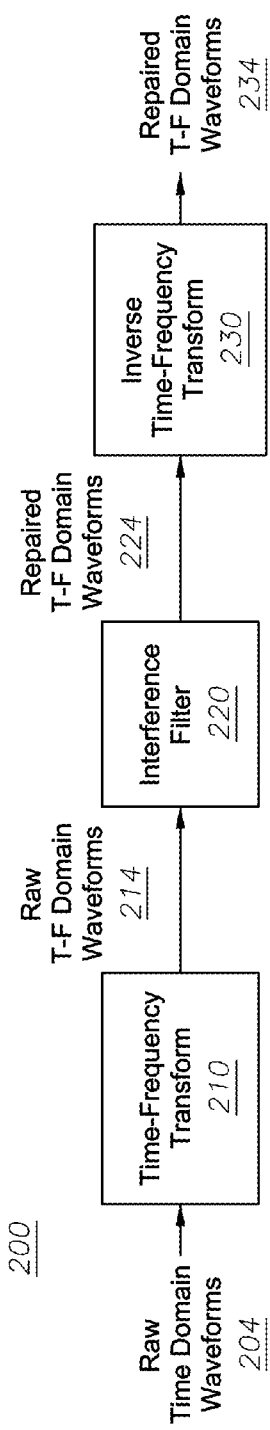
FIG. 2 illustrates a block diagram of radar interference mitigation module in accordance with various implementations described herein.

FIG. 2 illustrates a block diagram of radar interference mitigation module 200 in accordance with various implementations described herein. In some implementations, the radar interference mitigation module 200 is similar in scope and function to the radar interference mitigation module 158 of FIGS. 1A and 1B. Further, the radar interference mitigation module 200 may perform a radar interference mitigation technique, method, or process flow for processing radar signals or waveforms, as described in reference to the radar interference mitigation module 158 of FIGS. 1A and 1B.

As shown in reference to FIG. 2, the radar interference mitigation module 200 may include a time-frequency transform module 210, an interference filter module 220, and an inverse time-frequency transform module 230. These modules 210, 220, 230 may be configured in a series combination to repair time domain radar signals or waveforms by removing or mitigating at least a portion of interference, in a manner as follows.

The time-frequency transform module 210 may be configured to receive (raw) time domain signals or waveforms 204 (e.g., radar signals or waveforms in time domain) from a radar device, such as radar device 110 of FIG. 1A. In some implementations, the (raw) time domain signals or waveforms 204 may include time domain FMCW beat signals sampled, e.g., in 16-bit with 512 samples. One example of this beat signal in time domain with no interference is shown in FIG. 4. Further, the time-frequency transform module 210 may be configured to transform the received (raw) time domain signals or waveforms 204 into (raw) time-frequency (T-F) domain signals or waveforms 214 (e.g., radar signals or waveforms in time-frequency domain). This transformation may be achieved using a short-time Fourier transform or Wavelet transform. As such, in various implementations, transforming the time domain signals to time-frequency domain signals may involve using a short-time Fourier transform or a Wavelet transform to generate the time-frequency domain signals from the time domain signals.

Figure 5:
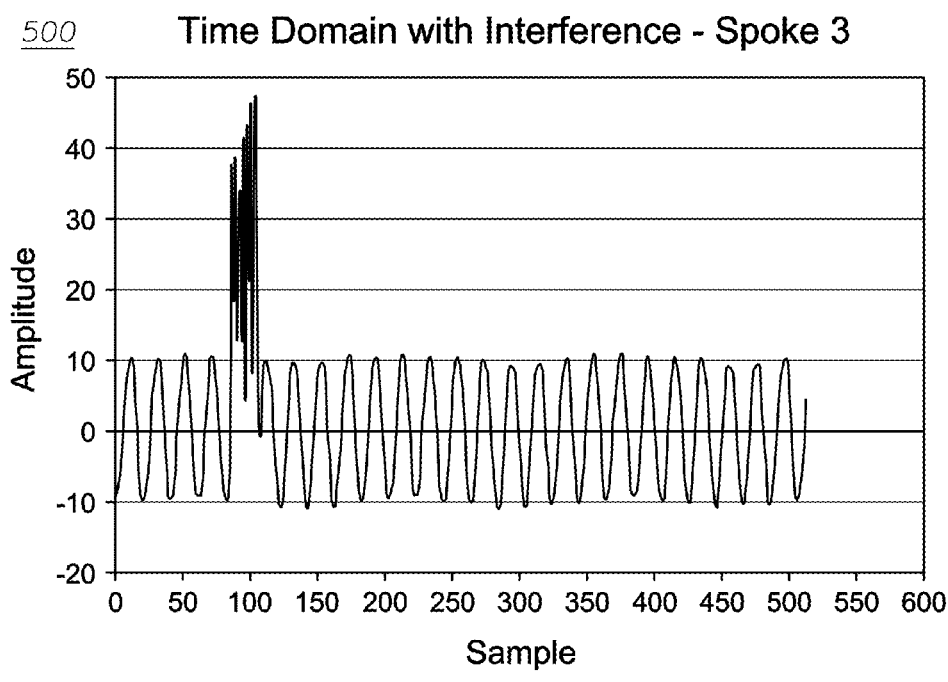
Figure 8:
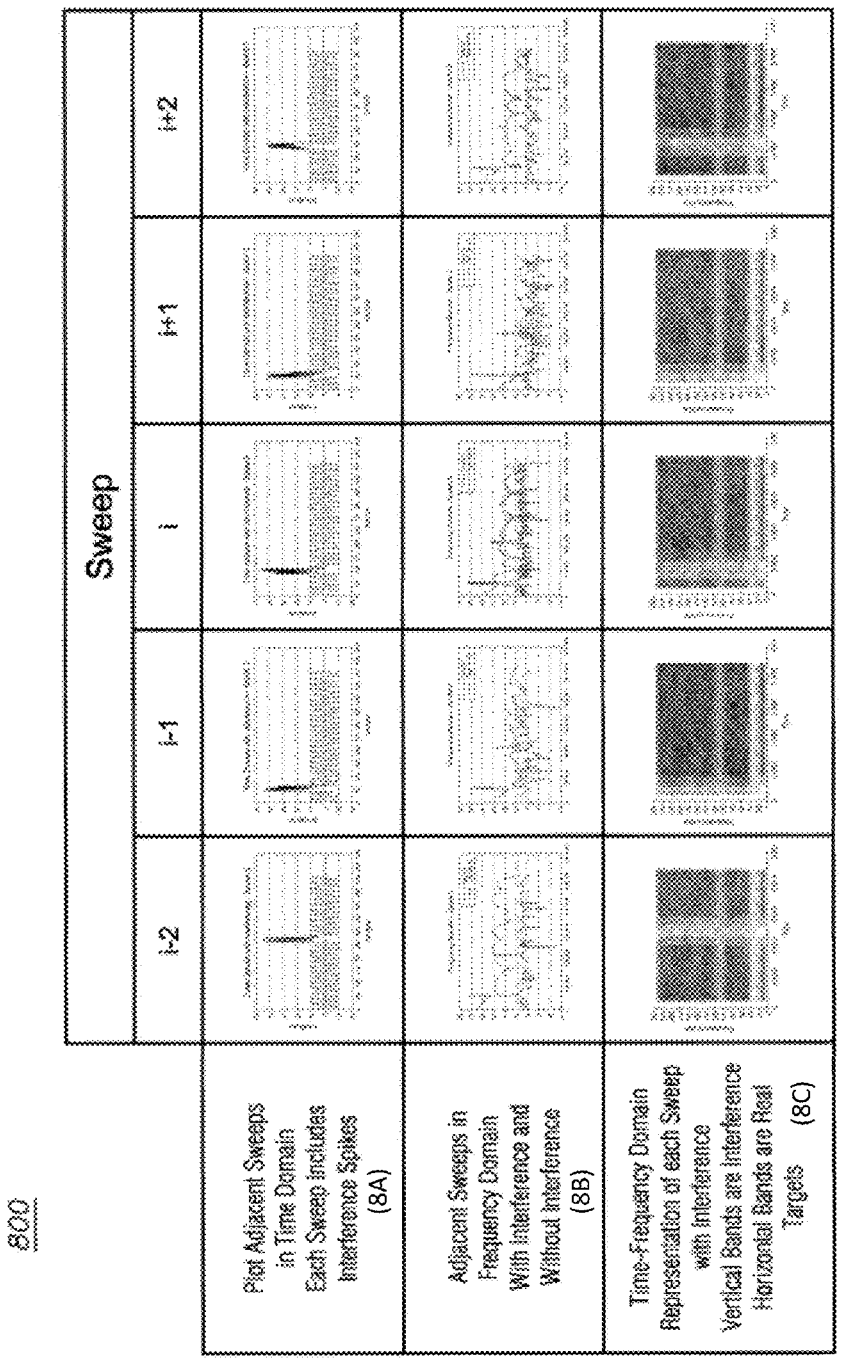

The interference filter module 220 may be configured to receive the (raw) time-frequency domain signals or waveforms 214 from the time-frequency transform module 210. Further, the interference filter module 220 may be configured to examine (or analyze or inspect) each time-frequency domain signal or waveform 214 with respect to one or more surrounding time-frequency domain signals or waveforms 214. In various instances, this examination may include comparing each time-frequency domain signal or waveform 214 with one or more surrounding time-frequency domain signals 214 to determine which of the time-frequency domain signals 214 have interference as part thereof. An example of a signal or waveform in time domain with no interference is shown in FIG. 4, an example of a signal or waveform in time domain with interference is shown in FIG. 5, and examples of surrounding signals or waveforms in time domain with interference are shown in FIG. 8. As will be explained herein, the interference filter module 220 may be configured to repair or modify the time-frequency domain signals 214 having interference and thus to provide repaired time-frequency domain signals or waveforms 224.

The inverse time-frequency transform module 230 may be configured to receive the (repaired) time-frequency domain signals or waveforms 224 from the interference filter module 220. The inverse time-frequency transform module 230 may be configured to inverse transform the (repaired) time-frequency domain signals or waveforms 224 into (repaired) time domain signals or waveforms 234 (e.g., radar signals or waveforms in time domain including repaired radar signals or waveforms in time domain). This inverse transformation may be achieved using an inverse short-time Fourier transform or inverse Wavelet transform. As such, in various implementations, inverse transforming the time-frequency domain signals to time domain signals may involve using an inverse short-time Fourier transform or an inverse Wavelet transform to generate the other (repaired) time domain signals from the time-frequency domain signals. The (repaired) time-frequency domain signals or waveforms 224 may be referred to as repaired spokes.

In one implementation, the radar interference mitigation module 200 of FIG. 2 refers to a technique, method, or process flow that uses a short-time Fourier transform (STFT) to detect and repair interference in FMCW waveforms. For instance, real targets or objects appear as horizontal lines in STFT (e.g., a constant beat frequency for duration of a sweep), whereas interference may take a different form in STFT (e.g., vertical lines). By comparing a current sweep with surrounding sweeps, the module 200 uses additional information available in previous or subsequent sweeps to detect interference. These and other aspects are described herein below.

Figure 3:
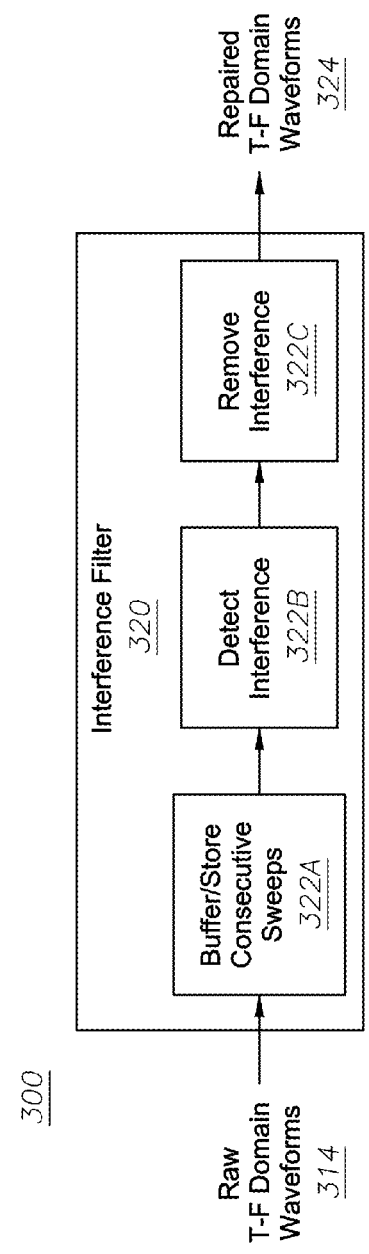
FIG. 3 illustrates a block diagram of interference filter module in accordance with various implementations described herein.

FIG. 3 illustrates a block diagram of interference filter 320 in accordance with various implementations described herein. In some implementations, the interference filter of FIG. 3 is similar in scope and function to the interference filter module 220 of FIG. 2. Further, the interference filter 320 may be configured to perform an interference filtering technique, method, or process flow for processing radar signals or waveforms.

As shown in reference to FIG. 3, the interference filter 320 may include a first module 322A for storing/buffering consecutive sweeps of a radar device, a second module 322B for detecting interference in sweeps, and a third module 322C for removing at least a portion of interference from sweeps having interference. These modules 322A, 322B, 322C may be configured in a series combination to buffer/store, detect, and repair time-frequency domain radar signals or waveforms by removing or mitigating at least a portion of interference, in a manner as follows.

The first module 322A of the interference filter 320 may be configured to receive (raw) time-frequency domain signals or waveforms 314, such as, e.g., the (raw) time-frequency domain signals or waveforms 214 of FIG. 2. Further, the first module 322A may be configured to buffer/store the time-frequency domain signals or waveforms 314 for consecutive sweeps of a radar device, where each sweep may include a rotation interval of the radar device over a pre-determined period of time. In some instances, the consecutive sweeps may include an upper boundary of sweeps of less than or equal to a dwell count of the radar device. In some other instances, the consecutive sweeps may include an upper boundary of sweeps of greater than or equal to three (3) and/or up to a dwell count of the radar device. Further, after buffering or storing, the first module 322A may be configured to provide (or output) the (raw) time-frequency domain signals or waveforms 314 to the second module 322B for further processing.

The second module 322B of the interference filter 320 may be configured to receive the (raw) time-frequency domain signals or waveforms 314 from the first module 322A. Further, the second module 322B may be configured to examine (or analyze or inspect) each time-frequency domain signal or waveform 314 to thus detect or determine which time-frequency domain signals or waveforms 314 have interference. In various implementations, as described herein, this examination may include comparing each time-frequency domain signal or waveform 314 with one or more surrounding time-frequency domain signals 314 to detect or determine which of the time-frequency domain signals 214 have interference as part thereof. Further, after detecting/determining which sweeps have interference, the second module 322B may be configured to provide (or output) signals or waveforms to the third module 322C for further processing.

In some instances, detecting or determining which of the time-frequency domain signals or waveforms 314 have interference may include determining a median magnitude for the multiple sweeps (i.e., consecutive sweeps). In another instance, detecting or determining which of the time-frequency domain signals have interference may include determining a mean magnitude for the multiple sweeps (i.e., consecutive sweeps). In still another instance, detecting or determining which of the time-frequency domain signals have interference may include determining a lower bounded magnitude for the multiple sweeps (i.e., consecutive sweeps). In any event, for each sweep, if a magnitude of the sweep is greater than the median magnitude plus a threshold, then the sweep may be identified as having interference. In various instances, the threshold may include a pre-determined threshold, such as, e.g., 5 dB or any desirable threshold. Otherwise, for each sweep, if a magnitude of the sweep is less than the median magnitude, then the sweep may be identified as not having interference. In this instance, no repair or modification of the sweep is performed.

The third module 322C may be configured to receive signals/waveforms from the second module 322B and then perform further processing on the (raw) time-frequency domain signals or waveforms 314. The third module 322C of the interference filter 320 may be configured to repair time-frequency domain radar signals or waveforms by removing or mitigating at least a portion of interference in the (raw) time-frequency domain signals or waveforms 314 having interference. After repairing, the third module 322C may be configured to provide (or output) the (repaired) time-frequency domain signals or waveforms 324 for further processing.

For instance, repairing the time-frequency domain radar signals or waveforms 314 may include zeroing a magnitude for each sweep having interference. In another instance, repairing the time-frequency domain radar signals or waveforms 314 may include determining a mean magnitude for the sweeps and replacing a magnitude for each sweep having interference with the median magnitude. In still another instance, repairing the time-frequency domain radar signals or waveforms 314 may include determining a median magnitude for the sweeps, determining an average vector difference between the multiple sweeps, and replacing a magnitude for each sweep having interference with an interpolated magnitude based on the median magnitude and/or the average vector difference. In any event, repairing the time-frequency domain radar signals or waveforms 314 may include modifying the time-frequency domain waveforms 314 having interference by adjusting a magnitude for each sweep having interference.

In various implementations, the interference filter 320 of FIG. 3 refers to a technique, method, or process flow that mitigates interference in FMCW radar, where interference is detected by comparing time-frequency plots of multiple sweeps, including consecutive sweeps. In this instance, interference may be removed by zeroing offending time/frequency cells or by interpolating values across a single frequency band within one sweep, or by interpolating between sweeps. In reference to FIG. 3, the interference filter 320 may be configured to buffer/store n consecutive sweeps. For real targets, each target may be present in a same time/frequency cell (or bin) for multiple sweeps (due to oversampling and/or multiple hits on target). If interference is present in the cell or bin, a significant difference between energy in the cell or bin may be compared to a same time/frequency cell in previous and/or subsequent sweeps. Thus, the radar interference filter 320 may be configured to compare a time/frequency cell in a current sweep (e.g., sweep i in FIG. 8) with surrounding sweeps (e.g., sweeps i−2, i−1, i+1, i+2) to determine if interference is present in the current sweep (e.g., sweep i). In some instances, each sweep in n sweeps may be referred to as an ith sweep.

There are multiple ways of performing this comparison with the surrounding sweeps. Some examples may include comparing a value of magnitude in a current sweep with a median value of magnitude in surrounding sweeps, comparing a value of magnitude in a current sweep with a mean value of magnitude in surrounding sweeps, and comparing a value of magnitude in a current sweep with a lower bounded value of magnitude in surrounding sweeps. In some instances, it may be expected that for moving targets, a phase of the time/frequency cell may be changing between sweeps. As such, comparison may be performed on a magnitude of values in the time/frequency cell.

One implementation for mitigating radar interference will now be described in reference to FIGS. 4-11.

FIG. 4 shows an example of a received beat signal 400 from an FMCW radar, wherein the received beat signal 400 is a beat signal without interference. In this case, the received signal is approximately 1 ms long, with the signal sampled at approximately 512 kHz (e.g., 512 samples). However, in various instances, the length of the received signal may include any length, and the sampling rate may include any sampling rate (or frequency) corresponding to any number of samples.

FIG. 5 shows an example of a received beat signal 500 from an FMCW radar, wherein the received beat signal 500 is a beat signal with interference. In this case, FIG. 5 shows the received signal of FIG. 4, but this time, the received signal is contaminated with interference (from, for example, a nearby pulse radar). The interference may occur at any frequency and at any time.

Figure 6:
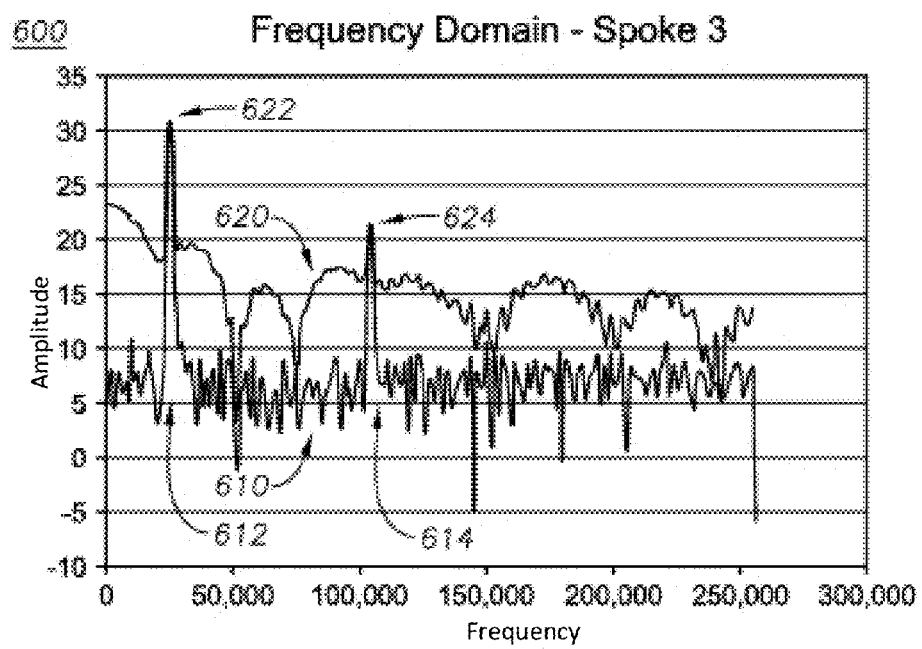

FIG. 6 shows an example of processing a received beat signal 600 using a fast Fourier transform (FFT), with results of the FFT of the received signal without interference (e.g., a first signal 610) and with interference (e.g., a second signal 620). In these cases, since each target echo from a radar may produce a different frequency return in a beat signal, the output of the FFT may represent a range of targets, which is shown in FIG. 6. For example, the first trace 610 in FIG. 6 shows two targets or spikes with a first target or spike 612 at approximately 25 kHz and a second target or spike 614 at approximately 100 kHz. The first trace 610 has a constant, relatively flat noise floor. However, the second trace 620 is shown contaminated with interference and has a relatively high noise floor. As shown in the second trace 620, only a first target or trace 622 (corresponding to the first trace 612) of targets 622, 624 is distinguishable. The second target or spike 624 may be hidden by the interference, as shown with the high noise floor of the second trace 620.

Figure 7:
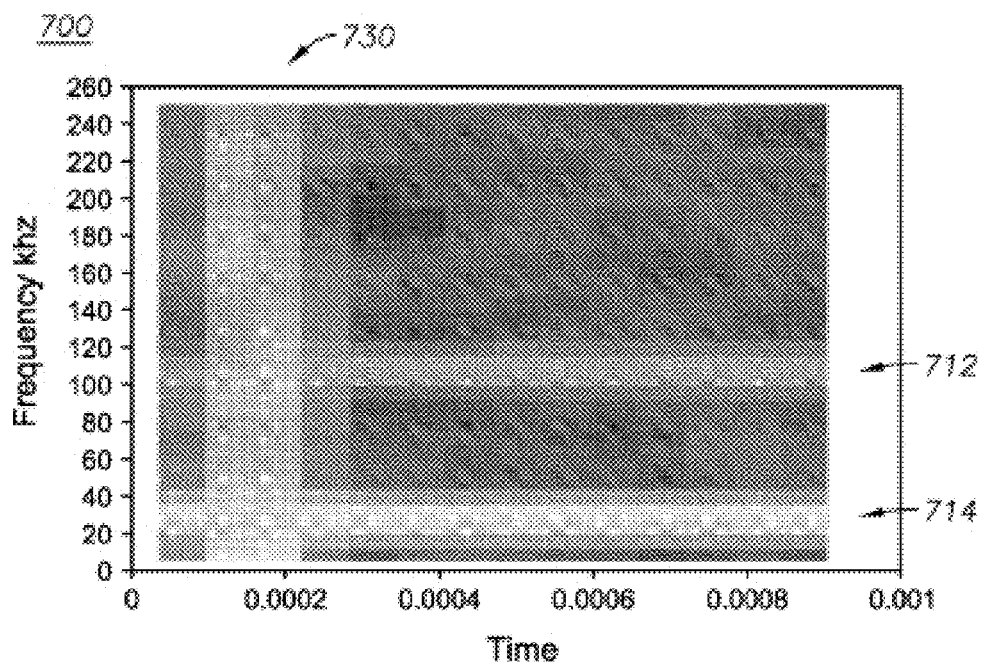

In one implementation, as described herein, the interference may be removed or at least partially removed. For instance, removing interference may involve performing a time-frequency (T-F) transform on the received signals using, e.g., a short-time Fourier transform (STFT) or a wavelet transform. FIG. 7 shows an example of processing a received signal 700 in time-frequency domain, where multiple targets or spikes 712, 714 are shown with horizontal lines, and interference 730 is shown with a vertical line. Next, the time-frequency representations for n sweeps may be buffered or stored in memory, where n is less than or equal to a dwell count of the radar. The T-F representation of n sweeps may be stored in a circular buffer that include the last n received sweeps. FIG. 8 shows an example of storing multiple or consecutive sweeps in a buffer, where the diagrams in FIG. 8 show T-F plots of five (5) sweeps (i.e., i−2, i−1, I, i+1, i+2), all of which may include interference. In some instances, for a FMCW radar that is in close proximity to a pulse radar, each sweep may include interference.

In reference to FIG. 8, the diagrams show the five (5) adjacent sweeps (i.e., i−2, i−1, I, i+1, i+2), e.g. 8A (time domain signal), 8B (frequency domain signal), and 8C (time-frequency domain signal). In some instances, a number (n) of sweeps stored may depend on a dwell count of the radar, where the number (n) of sweeps may be expected to hit each target given beam-width and rotation rate of the radar. Interference processing may be performed on sweep 'i' (i.e., sweep or spoke three (3)). Interference detection may involve comparing values of magnitudes for each cell or bin in the T-F plot for sweep 'i' with the same T-F cells in surrounding sweeps. In various instances, there are multiple methods for comparing cells. One method may include finding a median magnitude of a cell, where if the magnitude of the current cell >median+threshold, then the current cell may be marked as having interference.

As described herein, cells having interference may be repaired. For instance, one technique or method of achieving this may be to set a value of magnitude in the cell to zero. Another technique or method of achieving this may be to replace the cell with a median value. However, the values of magnitudes in each cell may be complex vectors, having a magnitude and a phase. As such, it is possible to determine a median magnitude and determine an average vector difference between sweeps, and use this to find an interpolated value for the cell, based on the values of the magnitudes for the cells in the adjacent or surrounding sweeps.

Figure 9:
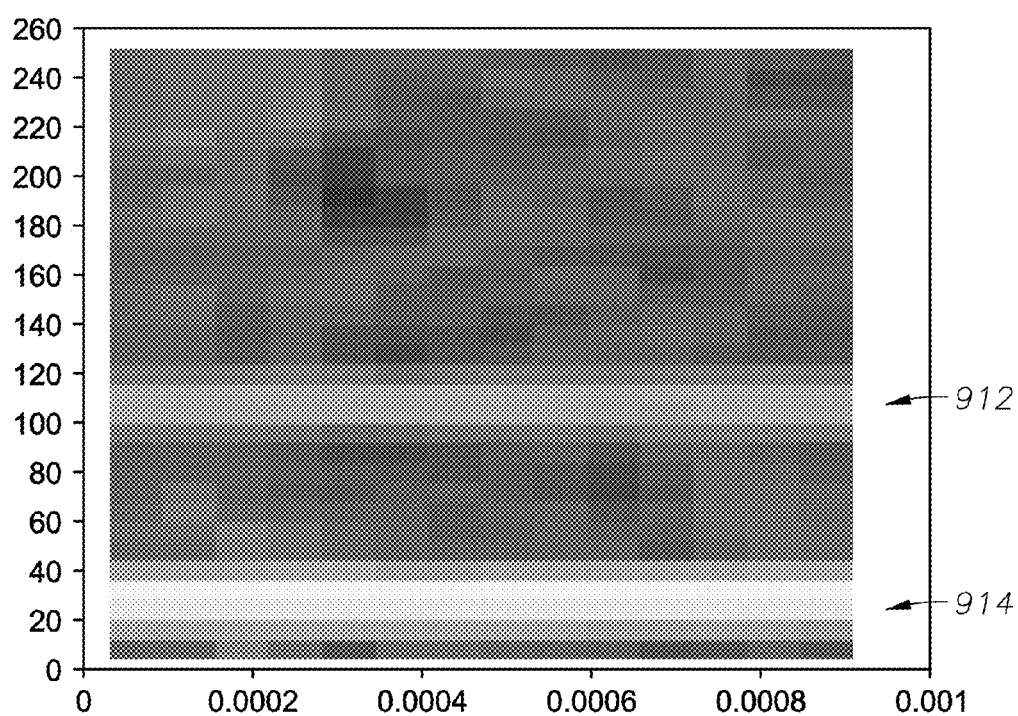

Further, in reference to FIG. 8, interference processing may be performed by examining each time-frequency cell or bin in a sweep against same time-frequency cells or bins of surrounding sweeps. It may be expected that the signal in the time-frequency cell or bin being tested may have some coherence with same time-frequency cells or bins in surrounding sweeps. If it does not, then interference may exist in the time-frequency cell or bin. For cells or bins that have interference, the interference may be removed or at least partially removed by various means, such as, e.g., interpolation or zeroing a value of magnitude for the cell or bin. As such, received signals having interference may be repaired in this manner. FIG. 9 shows an example of a repaired STFT signal 900, where the repaired time-frequency plot for sweep 'i' is shown. In FIG. 9, after repairing STFT signal 900 in time-frequency domain, the multiple targets or spikes 912, 914 are shown with horizontal lines, and little or no interference is shown with vertical lines.

Figure 10:
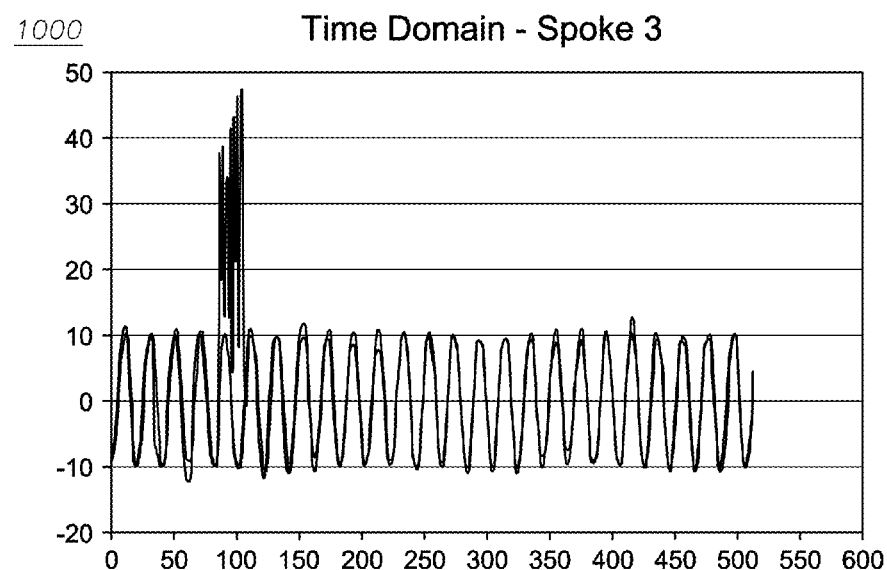
Figure 11:
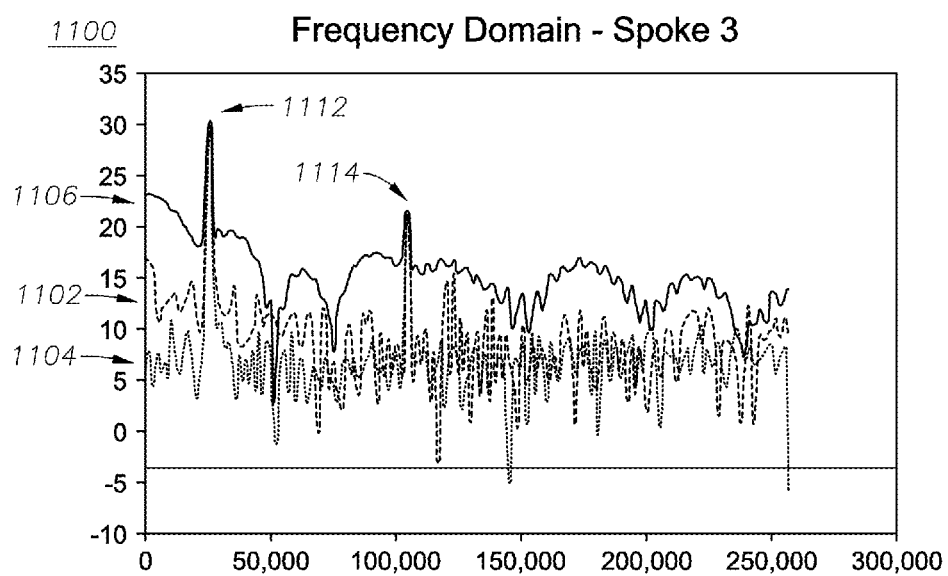

Next, a reverse time-frequency transform may be performed on the repaired time-frequency signal. FIG. 10 shows an example repaired signal 1000 in time domain, where the repaired T-F representation is transformed back to the time domain using the inverse T-F transform (e.g., in this case, inverse STFT). Next, a windowing and FFT processing of the repaired time domain signal may be performed in reference to FMCW radar processing techniques and methods. FIG. 11 shows an example of a repaired sweep 1100 that is windowed and transformed to the frequency domain using a FFT, according to FMCW signal processing. The plot in FIG. 11 shows the repaired signal 1102 (middle plot) compared to the ideal (no-interference) signal 1104 (lower plot) and the original signal 1106 with interference (upper plot). In this instance, the noise floor of the repaired signal 1102 (middle plot) is significantly lower than noise floor of the in the original signal 1106 with interference (upper plot), and in the repaired signal 1102 (middle plot), the two targets 1112, 1114 are distinguishable.

In reference to pulse radars, these types of radars may over-sample in azimuth (e.g., when there are many hits on a same target) to filter out interference from other pulse radars. Due to oversampling, return signals or echo signals may be expected from real targets that may exist in a same range cell for multiple transmissions (e.g., if a dwell count is 12, a point target may be expected to exist in 12 consecutive spokes). Further, using this information, it may be possible to implement a median filter (or similar) in azimuth that filters out "outlying" returns that may only exist for 1 or 2 spokes. As such, various techniques described herein may be implemented in pulse radars.

Various implementations of methods for mitigating radar interference will now be described in reference to FIGS. 12-14.

Figure 12:
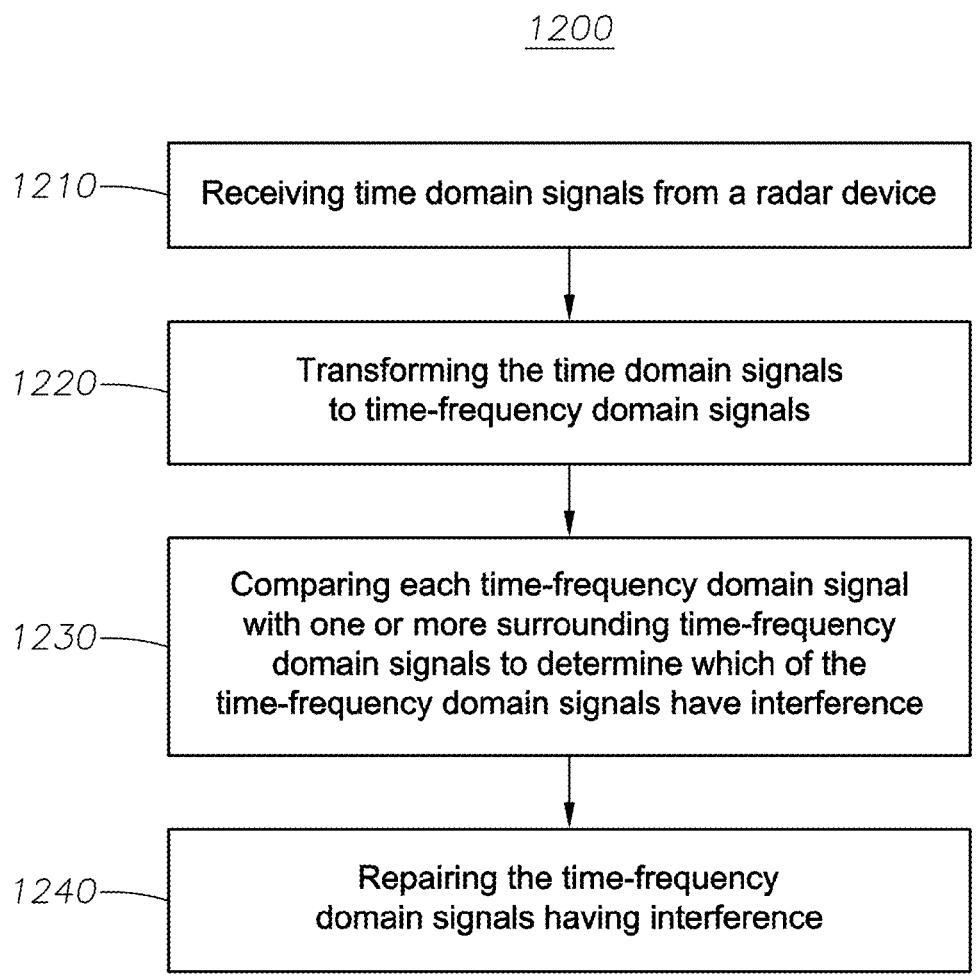
FIGS. 12-14 illustrate various process flow diagrams of methods for mitigating radar interference in accordance with various implementations described herein.

FIG. 12 illustrates a process flow diagram for a method 1200 of mitigating radar interference in accordance with implementations of techniques described herein. It should be understood that while method 1200 indicates a particular order of execution of operations, in some instances, certain portions of the operations may be executed in a different order, and on different systems. In some instances, the computing device 150 of FIG. 1A may be configured to perform method 1200. Further, in some other instances, additional operations or steps may be added to method 1200. Similarly, some operations or steps may be omitted.

At block 1210, method 1200 may receive time domain signals from a radar device. As described herein, the time domain signals may include radar related signals or waveforms in time domain.

At block 1220, method 1200 may transform the time domain signals to time-frequency domain signals. As described herein, transforming the time domain signals to time-frequency domain signals may involve using a short-time Fourier transform (STFT) or a wavelet transform to generate the time-frequency domain signals from the received time domain signals. Further, as described herein, the time-frequency domain signals may include radar related signals or waveforms in time-frequency domain.

At block 1230, method 1200 may compare each time-frequency domain signal with one or more surrounding time-frequency domain signals to determine which of the time-frequency domain signals have interference. Determining which of the time-frequency domain signals have interference may include determining a median magnitude for the multiple sweeps, determining a mean magnitude for the multiple sweeps, or determining a lower bounded magnitude for the multiple sweeps. In any event, for each sweep, if a magnitude of the sweep is greater than the median magnitude plus a pre-detrained threshold, then the sweep may be identified as having interference. Otherwise, for each sweep, if the magnitude of the sweep is less than the median magnitude, then the sweep may be identified as not having interference.

At block 1240, method 1200 may repair the time-frequency domain signals having interference. In some instances, repairing the time-frequency domain signals having interference may include zeroing a magnitude for each sweep having interference. In other instances, repairing the time-frequency domain signals having interference may include determining a mean magnitude for the multiple sweeps and replacing a magnitude for each sweep having interference with the median magnitude. In some other instances, repairing the time-frequency domain signals having interference may include determining a median magnitude for the multiple sweeps, determining an average vector difference between the multiple sweeps, and replacing a magnitude for each sweep having interference with an interpolated magnitude based on the median magnitude and/or the average vector difference.

In some implementations, method 1200 may further store the time-frequency domain signals for multiple sweeps of the radar device, wherein each sweep may include a rotation interval of the radar device over a period of time. Further, the multiple sweeps may include an upper boundary of sweeps of less than or equal to a dwell count of the radar device. Further, in some implementations, method 1200 may further transform the time-frequency domain signals including the repaired time-frequency domain signals to other time domain signals including repaired time domain signals.

Figure 13:
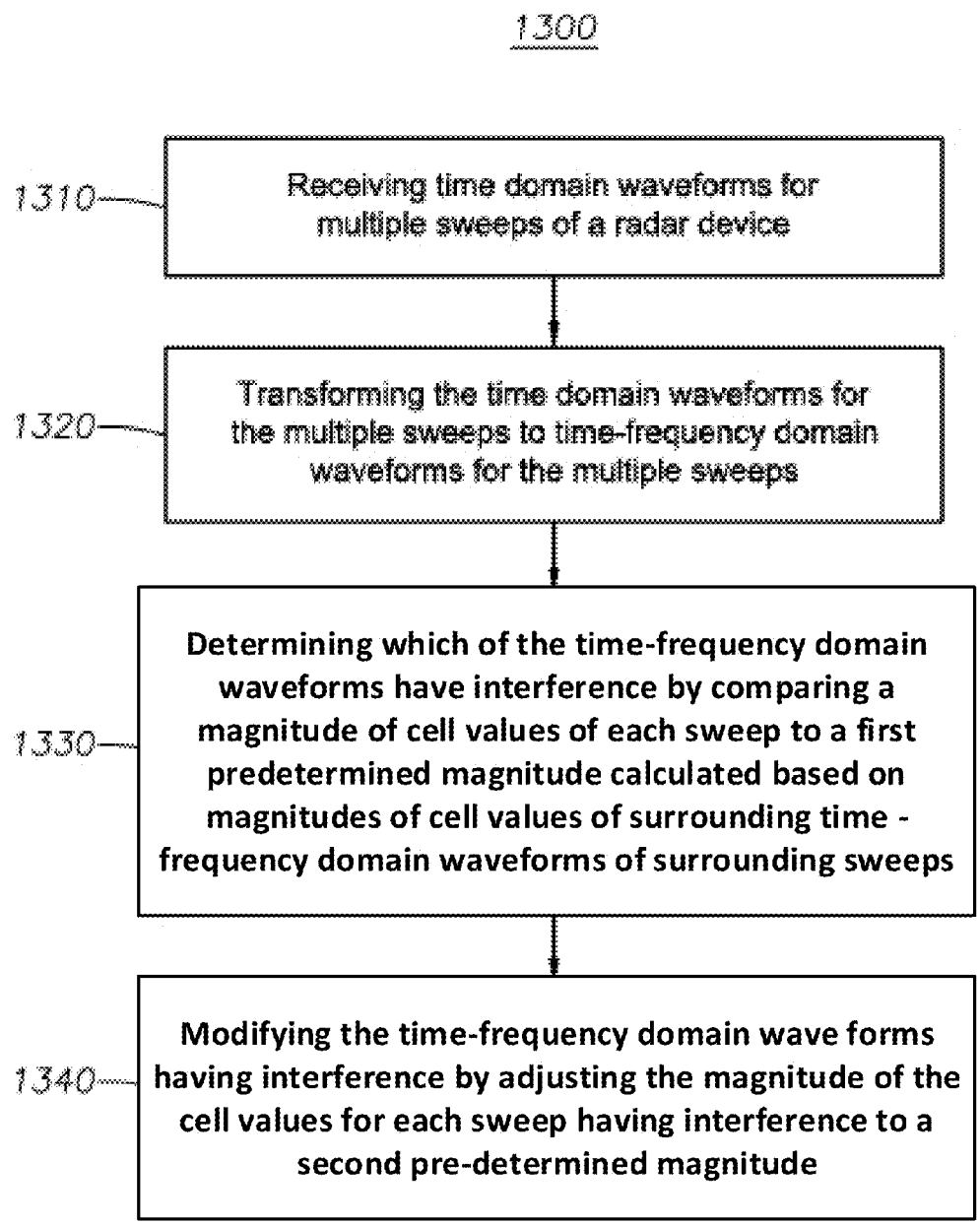

FIG. 13 illustrates a process flow diagram for another method 1300 of mitigating radar interference in accordance with implementations of techniques described herein. It should be understood that while method 1300 indicates a particular order of execution of operations, in some instances, certain portions of the operations may be executed in a different order, and on different systems. In some instances, the computing device 150 of FIG. 1A may be configured to perform method 1300. Further, in some other instances, additional operations or steps may be added to method 1300. Similarly, some operations or steps may be omitted.

At block 1310, method 1300 may receive time domain waveforms (or signals) for multiple sweeps of a radar device. Further, at block 1320, method 1300 may transform the time domain waveforms (or signals) for the multiple sweeps to time-frequency domain waveforms (or signals) for the multiple sweeps.

At block 1330, method 1300 may determine which of the time-frequency domain waveforms (or signals) have interference by comparing a magnitude of each time-frequency domain waveform for each sweep to a first pre-determined magnitude calculated based on magnitudes of surrounding time-frequency domain waveforms (or signals) of surrounding sweeps. In various instances, the first pre-determined magnitude may include a median magnitude of the multiple sweeps, a mean magnitude of the multiple sweeps, or a lower bounded magnitude of the multiple sweeps.

At block 1340, method 1300 may modify the time-frequency domain waveforms (or signals) having interference by adjusting the magnitude for each sweep having interference to a second pre-determined magnitude. In various instances, the second pre-determined magnitude may include a zero magnitude or a median magnitude of the multiple sweeps. In various other instances, the second pre-determined magnitude may include an interpolated magnitude based on the median magnitude of the multiple sweeps and an average vector difference between the multiple sweeps.

In some implementations, method 1300 may further store the time-frequency domain waveforms (or signals) for the multiple sweeps. In some instances, method 1300 may further transform time-frequency domain waveforms (or signals) including repaired time-frequency domain waveforms (or signals) to other time domain signals including repaired time domain signals.

Figure 14:
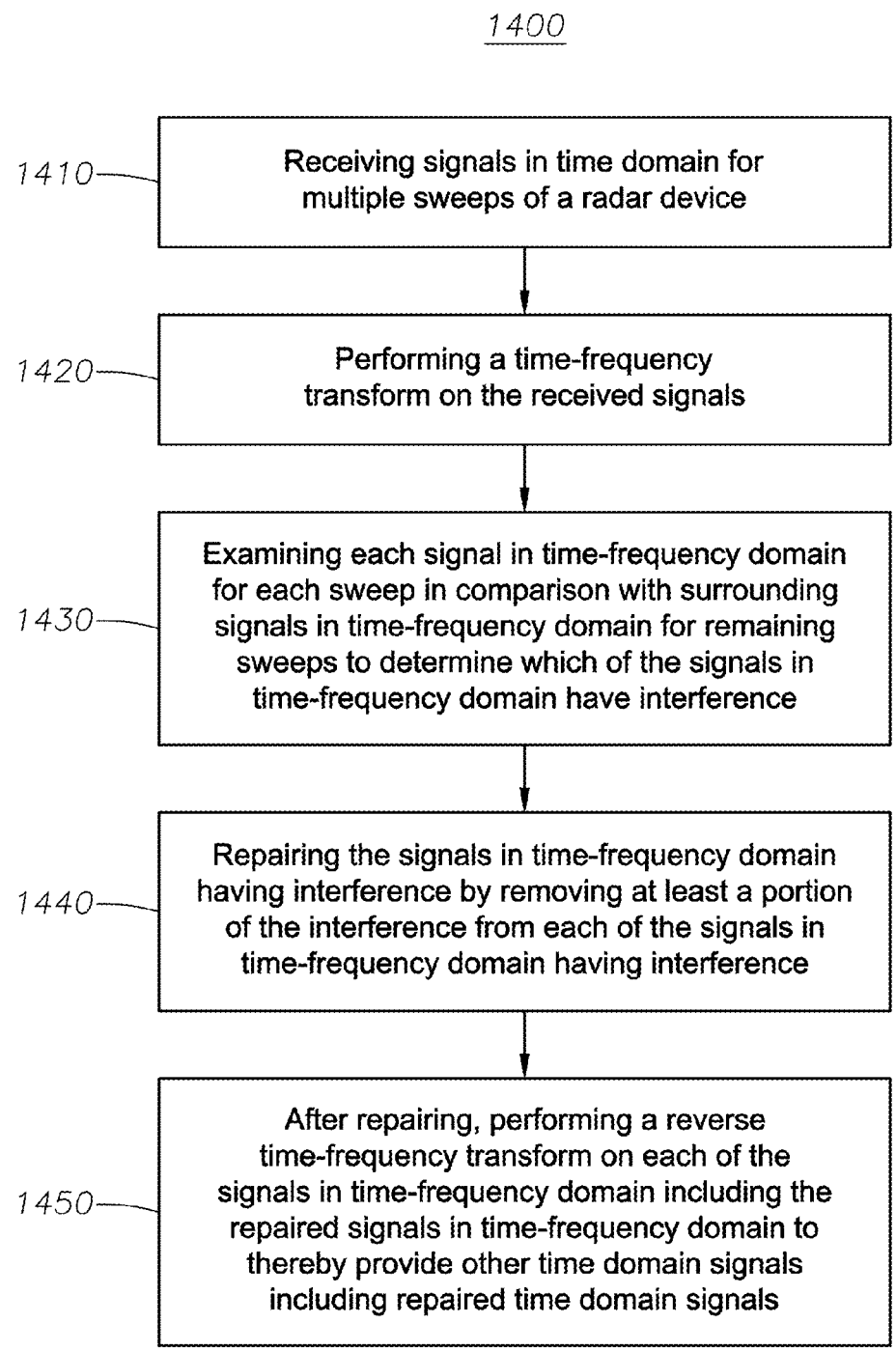

FIG. 14 illustrates a process flow diagram for another method 1400 of mitigating radar interference in accordance with implementations of techniques described herein. It should be understood that while method 1400 indicates a particular order of execution of operations, in some instances, certain portions of the operations may be executed in a different order, and on different systems. In some instances, the computing device 150 of FIG. 1A may be configured to perform method 1400. Further, in some other instances, additional operations or steps may be added to method 1400. Similarly, some operations or steps may be omitted.

At block 1410, method 1400 may receive signals (or waveforms) in time domain for multiple sweeps of a radar device. At block 1420, method 1400 may perform a time-frequency transform on the received signals (or waveforms).

At block 1430, method 1400 may examine each signal in time-frequency domain for each sweep in comparison with surrounding signals (or waveforms) in time-frequency domain for remaining sweeps to determine which of the signals (or waveforms) in time-frequency domain have interference. In various instances, determining which of the time-frequency domain signals have interference may include comparing a magnitude of each time-frequency domain signal for each sweep to a first pre-determined magnitude calculated based on magnitudes of surrounding time-frequency domain signals of surrounding sweeps. Further, the first pre-determined magnitude may include a median magnitude of the multiple sweeps, a mean magnitude of the multiple sweeps, or a lower bounded magnitude of the multiple sweeps.

At block 1440, method 1400 may repair the signals (or waveforms) in time-frequency domain having interference by removing at least a portion of the interference from each of the signals (or waveforms) in time-frequency domain having interference. In various instances, removing at least a portion of the interference from each of the time-frequency domain signals having interference may include modifying the time-frequency domain signals having interference by adjusting the magnitude for each sweep having interference to a second pre-determined magnitude. Further, the second pre-determined magnitude may include a zero magnitude, a median magnitude of the multiple sweeps, or an interpolated magnitude based on the median magnitude of the multiple sweeps and an average vector difference between the multiple sweeps.

At block 1450, method 1400 may, after repairing, perform a reverse time-frequency transform on each of the signals (or waveforms) in time-frequency domain including the repaired signals (or waveforms) in time-frequency domain to thereby provide other time domain signals (or waveforms) including repaired time domain signals (or waveforms). In some implementations, method 1400 may store the time-frequency domain signals for the multiple sweeps of the radar device.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in the context of marine electronics and systems therefor, such as devices found in marine vessels and/or navigation systems. Further, ship instruments and equipment may be connected to computing systems described herein for executing navigation technologies, as described herein. Still further, the computing systems may be configured to operate using various radio frequency technologies and implementations, such as sonar, radar, GPS, and other similar technologies.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Marine Electronics Device

Figure 15:
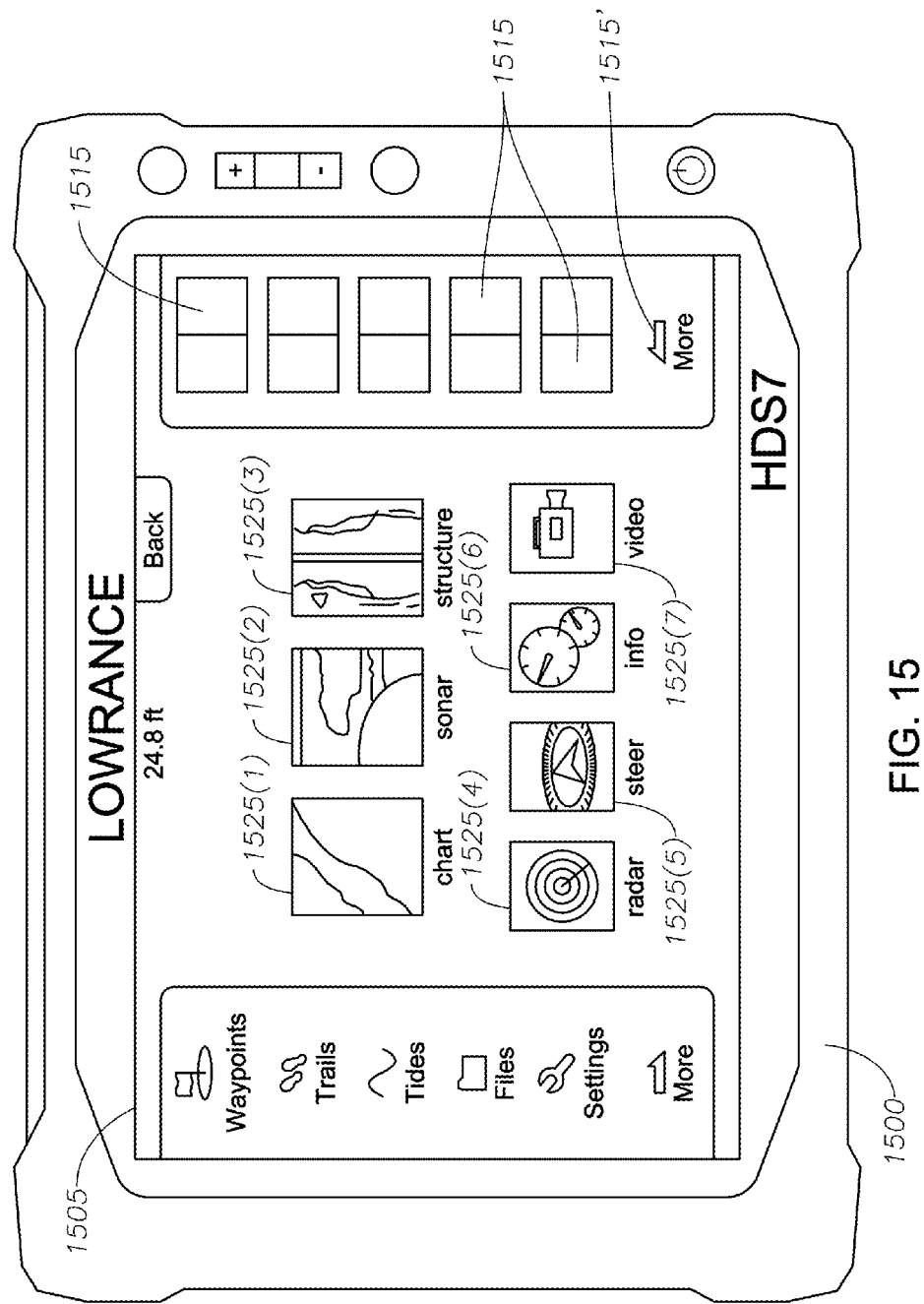
FIG. 15 illustrates a schematic of a marine electronics device in accordance with various implementations described herein.

FIG. 15 illustrates a schematic diagram of the marine electronics device 1500 in accordance with various implementations described herein. In some implementations, the marine electronics device 1500 includes the scope and functionality of the computing device 150 of FIG. 1A. The marine electronics device 1500 may include a display device, such as a multi-function display (MFD) or similar marine display, having a screen 1510 with a graphical user interface (GUI) 1505. The GUI 1505 may be configured to process and send commands and/or instructions to the radar device 110 of FIG. 1A, and these commands and/or instructions may be used to interface with the radar 120A of the radar device 110, as described herein in reference to mitigating radar interference in radar signals. The GUI 1505 may display radar data and information to a user. The GUI 1505 may provide various icons 1535 to control the radar settings.

Further, the GUI 1505 may provide a selection of marine electronics data types for display in accordance with marine based navigation. The different marine electronics data types may be presented by icons 1525. The icons may include an icon for chart data type 1525(1), sonar data type 1525(2), structure data type 1525(3), radar data type 1525(4), steering data type 1525(5), dashboard information type 1525(6), and video 1525(7). In some implementations, the screen 1510 may be sensitive to touch by a human finger, and/or the screen 1510 may be sensitive to body heat from a finger, a stylus, or responsive to a mouse. As further shown, the marine electronics device 1500 may include a plurality of buttons 1520, which may include physical buttons and/or virtual buttons, or some combination thereof.

The chart data type icon 1525(1) may be configured for displaying a local map of a region surrounding the location of the marine electronics device 1500. Where the marine electronics device 1500 is carried over a body of water by a vessel, the sonar data type icon 1525(2) may be configured for displaying sonar data from the body of water surrounding the vessel. The structure data type icon 1525(3) may be configured for providing a higher resolution image covering a wider area of the body of water surrounding the vessel. The radar data type icon 1525(4) may be configured for providing a radar view of the area surrounding the marine electronics device 1500. The steering data type icon 1525(5) may be configured for displaying information, such as distance to destination, speed over ground, and time to destination. The dashboard data type icon 1525(6) may be configured for displaying an instrument panel for a vessel carrying the marine electronics device 1500. The instrument panel may include measurement meters that provide information such as, for example, bearing, speed, fuel level, and oil level.

Additionally, the screen 1510 may display a side tray 1530 of additional options 1515. Among the additional options 1515 may be an option 1515' for more additional options. In some instances, selection of option 1515' may provide and/or display another tray menu that includes an option for customizing the display.

In various implementations, the marine electronics device 1500 may be attached to various buses and/or networks, such as, e.g., a National Marine Electronics Association (NMEA) bus or network. The marine electronics device 1500 may send or receive data to or from another device attached to the NMEA 2000 bus. For instance, the marine electronics device 1500 may transmit commands and receive data from a motor or a sensor using an NMEA 2000 bus. In some implementations, the marine electronics device 1500 may be capable of steering a vessel and controlling the speed of the vessel, i.e., autopilot. For instance, one or more waypoints may be input to the marine electronics device 1500, and the marine electronics device 1500 may be configured to steer the vessel to the one or more waypoints. Further, the marine electronics device 1500 may be configured to transmit and/or receive NMEA 2000 compliant messages, messages in a proprietary format that do not interfere with NMEA 2000 compliant messages or devices, and/or messages in any other format. In various other implementations, the marine electronics device 400 may be attached to various other communication buses and/or networks configured to use various other types of protocols that may be accessed via, e.g., NMEA 2000, NMEA 0183, Ethernet, Proprietary wired protocol, etc.

The marine electronics device 1500 may be operational with numerous general purpose or special purpose computing system environments and/or configurations. The marine electronics device 1500 may include any type of electrical and/or electronics device capable of processing data (including, e.g., various environmental sensor type data) and information via a computing system. The marine electronics device 1500 may include various marine instruments, such that the marine electronics device 1500 may use the computing system to display and/or process the one or more types of marine electronics data. The device 1500 may display marine electronic data, such as, e.g., radar data and images associated with radar data. As described herein, the marine electronic data types may include chart data, radar data, sonar data, steering data, dashboard data, navigation data, fishing data, engine data, and various other similar data.

The marine electronics device 1500 may be configured as a computing system having a central processing unit (CPU), a system memory, a graphics processing unit (GPU), and a system bus that couples various system components including the system memory to the CPU. In various implementations, the computing system may include one or more CPUs, which may include a microprocessor, a microcontroller, a processor, a programmable integrated circuit, or a combination thereof. The CPU may include an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. Further, the GPU may generate user interfaces (UIs) including graphical user interfaces (GUIs) that provide, present, and/or display the output data. The GPU may also provide objects, such as menus, in the GUI. In some instances, a user may provide input by interacting with objects, and the GPU may receive input from interaction with objects and provide the received input to the CPU. Further, in some instances, a video adapter may be provided to convert graphical data into signals for a monitor, such as, e.g., MFD 1500.

The system bus may be any of several types of bus structures, including a memory bus or memory controller, a peripheral bus, and a local bus using any of a variety of bus architectures. By way of instance, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For instance, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of instance, and not limitation, communication media may include wired media such as a wired network or direct-wired connection, and wireless media such as acoustic, radio frequency (RF), infrared (IR), and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs. In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™ technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some instances, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for instance, recorded points. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons, which may be physical buttons, virtual buttons, or combinations thereof. Other input devices may include a microphone, a mouse, or the like (not shown). These and other input devices may be connected to the CPU through a serial port interface coupled to system bus, but may be connected by other interfaces, such as a parallel port, game port or a universal serial bus (USB).

Some implementations may be configured for connection to a GPS receiver system and/or a marine electronics device or system. The GPS system and/or marine electronics device or system may be connected via a network interface. For instance, the GPS receiver system may be used to determine position data for the vessel on which the marine electronics device 1500 is disposed. Further, the GPS receiver system may be configured to transmit geo-position data to the marine electronics device 1500. In other instances, any positioning system known to those skilled in the art may be used to determine and/or provide the position data for the marine electronics device 1500.

In various implementations, the marine electronics device or system may include one or more components disposed at various locations on a vessel. Such components may include one or more data modules, sensors, instrumentation, and/or any other devices known to those skilled in the art that may transmit various types of data to the marine electronics device 1500 for processing and/or display. The various types of data transmitted to the marine electronics device 1500 may include marine electronics data and/or other data types known to those skilled in the art. The marine electronics data received from the marine electronics device or system may include chart data, sonar data, structure data, radar data, navigation data, position data, heading data, automatic identification system (AIS) data, Doppler data, speed data, course data, or any other type known to those skilled in the art.

In one implementation, the marine electronics device or system may include a radar sensor for recording the radar data and/or the Doppler data, a compass heading sensor for recording the heading data, and a position sensor for recording the position data. In a further implementation, the marine electronics device or system may include a sonar transducer for recording the sonar data, an AIS transponder for recording the AIS data, a paddlewheel sensor for recording the speed data, and/or the like.

The marine electronics device 1500 may receive external data via a LAN or a WAN. In some implementations, external data may relate to information not available from various marine electronics systems. The external data may be retrieved from the Internet or any other source. The external data may include atmospheric temperature, atmospheric pressure, tidal data, weather, temperature, moon phase, sunrise, sunset, water levels, historic fishing data, and/or various other fishing data.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, instances of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For instance, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as instance forms of implementing the claims.

What is claimed is:

1. A method comprising:
    receiving time domain signals from a radar device, wherein each of the time domain signals is obtained during a sweep of the radar device;
    transforming, using a processor, the time domain signals to time-frequency domain signals;
    comparing, using the processor, each time-frequency domain signal with one or more previous or subsequent time-frequency domain signals to determine which of the time-frequency domain signals have interference;
    repairing, using the processor, the time-frequency domain signals having interference by:
        determining a median magnitude of cell values for multiple sweeps of the radar device,
        determining an average vector difference between the multiple sweeps, and
        replacing a magnitude for each sweep having interference with an interpolated magnitude based on the median magnitude of cell values and the average vector difference; and
    detecting, using the processor, a target using the repaired time-frequency domain signals.

2. The method of claim 1, wherein the radar device comprises a frequency-modulated continuous-wave (FMCW) radar or a pulse compression radar.

3. The method of claim 1, wherein the time domain signals comprise radar related waveforms in time domain, and wherein the time-frequency domain signals comprise radar related waveforms in time-frequency domain.

4. The method of claim 1, wherein transforming the time domain signals to time-frequency domain signals involves using a short-time Fourier transform to generate the time-frequency domain signals from the time domain signals.

5. The method of claim 1, further comprising storing the time-frequency domain signals for multiple sweeps of the radar device, wherein each sweep comprises a rotation interval of the radar device over a period of time.

6. The method of claim 1, wherein determining which of the time-frequency domain signals have interference, comprises:
    storing the time-frequency domain signals for multiple sweeps of the radar device,
    determining a median magnitude of cell values for the multiple sweeps, for each sweep, if a magnitude of cell values of the sweep is greater than the median magnitude of cell values for the multiple sweeps plus a threshold, then the sweep is identified as having interference, and
    for each sweep, if the magnitude of cell values of the sweep is less than the median magnitude of cell values for the multiple sweeps, then the sweep is identified as not having interference.

7. The method of claim 1, wherein determining which of the time-frequency domain signals have interference, comprises:
    storing the time-frequency domain signals for multiple sweeps of the radar device,
    determining a mean magnitude of cell values for the multiple sweeps,
    for each sweep, if a magnitude of cell values of the sweep is greater than the mean magnitude of cell values for the multiple sweeps plus a threshold, then the sweep is identified as having interference, and
    for each sweep, if the magnitude of cell values of the sweep is less than the mean magnitude for the multiple sweeps, then the sweep is identified as not having interference.

8. The method of claim 1, wherein determining which of the time-frequency domain signals have interference, comprises:
    storing the time-frequency domain signals for multiple sweeps of the radar device,
    determining a lower bounded magnitude of cell values for the multiple sweeps, for each sweep, if a magnitude of cell values of the sweep is greater than the lower bounded magnitude plus a threshold, then the sweep is identified as having interference, and for each sweep, if the magnitude of cell values of the sweep is less than the lower bounded magnitude, then the sweep is identified as not having interference.

9. The method of claim 1, further comprising transforming each of the time-frequency domain signals into time domain signals.

10. A non-transitory computer-readable medium having stored thereon a plurality of computer-executable instructions which, when executed by a computer, cause the computer to:

receive time domain waveforms for multiple sweeps of a radar device, wherein each of the time domain waveforms is obtained during a sweep of the radar device;

transform the time domain waveforms for the multiple sweeps to time-frequency domain waveforms for the multiple sweeps;

determine which of the time-frequency domain waveforms have interference by comparing a magnitude of cell values of each time-frequency domain waveform for each sweep to a first pre-determined magnitude calculated based on magnitudes of cell values of previous or subsequent time-frequency domain waveforms of previous or subsequent sweeps; and repairing, using the processor, the time-frequency domain signals having interference by:

determining a median magnitude of cell values for multiple sweeps of the radar device, determining an average vector difference between the multiple sweeps, and replacing a magnitude for each sweep having interference with an interpolated magnitude based on the median magnitude of cell values and the average vector difference.

11. The non-transitory computer-readable medium of claim 10, further comprising instructions that cause the computer to:

store the time-frequency domain waveforms for the multiple sweeps; and transform each of the time-frequency domain waveforms into time domain waveforms.

12. The non-transitory computer-readable medium of claim 10, wherein the first pre-determined magnitude comprises a median magnitude of cell values of the multiple sweeps, a mean magnitude of cell values of the multiple sweeps, or a lower bounded magnitude of cell values of the multiple sweeps.

13. The non-transitory computer-readable medium of claim 10, wherein the second pre-determined magnitude comprises a zero magnitude, a median magnitude of cell values of the multiple sweeps, or an interpolated magnitude based on the median magnitude of cell values of the multiple sweeps and an average vector difference between the multiple sweeps.

14. A method comprising:

receiving signals in time domain for multiple sweeps of a radar device, wherein each of the time domain signals is obtained during a sweep of the radar device;

performing, using a processor, a time-frequency transform on the received signals;

examining, using the processor, each signal for each sweep in comparison with previous or subsequent signals for previous or subsequent sweeps to determine which of the signals have interference;

repairing, using the processor, the signals in time-frequency domain having interference by:

determining a median magnitude of cell values for multiple sweeps of the radar device, determining an average vector difference between the multiple sweeps, and replacing a magnitude for each sweep having interference with an interpolated magnitude based on the median magnitude of cell values and the average vector difference;

performing, using the processor, a reverse time-frequency transform on each of the signals in time-frequency domain including the repaired signals in time-frequency domain, thereby providing repaired time domain signals, and detecting, using a processor, a target based on the repaired time domain signals.

15. The method of claim 14, further comprising storing the time-frequency domain signals for the multiple sweeps of the radar device, wherein determining which of the time-frequency domain signals have interference comprises:

comparing a magnitude of cell values of each time-frequency domain signal for each sweep to a first pre-determined magnitude calculated based on magnitudes of cell values of surrounding time-frequency domain signals of surrounding sweeps, wherein the first pre-determined magnitude comprises a median magnitude of cell values of the multiple sweeps, a mean magnitude of cell values of the multiple sweeps, or a lower bounded magnitude of cell values of the multiple sweeps.

16. The method of claim 14, further comprising storing the time-frequency domain signals for the multiple sweeps of the radar device, wherein removing at least a portion of the interference from each of the time-frequency domain signals having interference comprises:

modifying the time-frequency domain signals having interference by adjusting the magnitude of cell values for each sweep having interference to a second pre-determined magnitude, wherein the second pre-determined magnitude comprises a zero magnitude, a median magnitude of cell values of the multiple sweeps, or an interpolated magnitude based on the median magnitude of cell values of the multiple sweeps and an average vector difference between the multiple sweeps.

\* \* \* \* \*